US012163651B2

(12) United States Patent
Sekiya et al.

(10) Patent No.: US 12,163,651 B2
(45) Date of Patent: Dec. 10, 2024

(54) HEAT INSULATION STRUCTURE AND ELECTRONIC APPARATUS

(71) Applicant: SONY GROUP CORPORATION, Tokyo (JP)

(72) Inventors: Tomoyuki Sekiya, Tokyo (JP); Shiro Asashima, Tokyo (JP); Takeo Mitsui, Tokyo (JP)

(73) Assignee: SONY GROUP CORPORATION, Tokyo (JP)

( * ) Notice: Subject to any disclaimer, the term of this patent is extended or adjusted under 35 U.S.C. 154(b) by 275 days.

(21) Appl. No.: 17/596,332

(22) PCT Filed: Jun. 10, 2020

(86) PCT No.: PCT/JP2020/022927
§ 371 (c)(1),
(2) Date: Dec. 8, 2021

(87) PCT Pub. No.: WO2020/255838
PCT Pub. Date: Dec. 24, 2020

(65) Prior Publication Data
US 2022/0235928 A1    Jul. 28, 2022

(30) Foreign Application Priority Data

Jun. 20, 2019 (JP) ................................. 2019-114488
Nov. 1, 2019 (JP) ................................. 2019-200073

(51) Int. Cl.
*F21V 29/15* (2015.01)
*F21V 29/87* (2015.01)
*F21V 29/90* (2015.01)
*H04N 9/31* (2006.01)

(52) U.S. Cl.
CPC .............. *F21V 29/15* (2015.01); *F21V 29/87* (2015.01); *F21V 29/90* (2015.01); *H04N 9/3144* (2013.01)

(58) Field of Classification Search
CPC .......... F21V 29/15; F21V 29/87; F21V 29/90; H04N 9/3144
See application file for complete search history.

(56) References Cited

U.S. PATENT DOCUMENTS

| 2010/0091251 A1 | 4/2010 | Fujibayashi et al. |
| 2016/0003404 A1 | 1/2016 | Shibata et al. |
| 2018/0245731 A1 | 8/2018 | Kohmyohji et al. |

(Continued)

FOREIGN PATENT DOCUMENTS

| CN | 101902894 A | 12/2010 |
| CN | 104132261 A | * 11/2014 |

(Continued)

OTHER PUBLICATIONS

Huang et al., Efficient Radiating Type LED Lamp, Nov. 5, 2014, CN104132261A, Whole Document (Year: 2014).*

(Continued)

*Primary Examiner* — Larry L Furdge
(74) *Attorney, Agent, or Firm* — CHIP LAW GROUP

(57) ABSTRACT

A heat insulation structure of one embodiment of the present disclosure includes: a heat source; a heat insulating member surrounding the heat source and having an opening; and a shape retaining member retaining a shape of the heat insulating member.

18 Claims, 16 Drawing Sheets

(56) References Cited

U.S. PATENT DOCUMENTS

2019/0017683 A1* 1/2019 Blandin .................... F21V 9/04
2020/0269543 A1* 8/2020 Yang ....................... B32B 7/027

FOREIGN PATENT DOCUMENTS

| | | |
|---|---|---|
| CN | 105008786 A | 10/2015 |
| CN | 108501465 A | 9/2018 |
| EP | 2963325 A1 | 1/2016 |
| JP | 2007088324 A | 4/2007 |
| JP | 2010-139635 A | 6/2010 |
| JP | 2016-038168 A | 3/2016 |
| JP | 2018-141524 A | 9/2018 |
| WO | 2014/132652 A1 | 9/2014 |

OTHER PUBLICATIONS

International Search Report and Written Opinion of PCT Application No. PCT/JP2020/022927, issued on Aug. 18, 2020, 10 pages of ISRWO.

* cited by examiner

[FIG. 1]
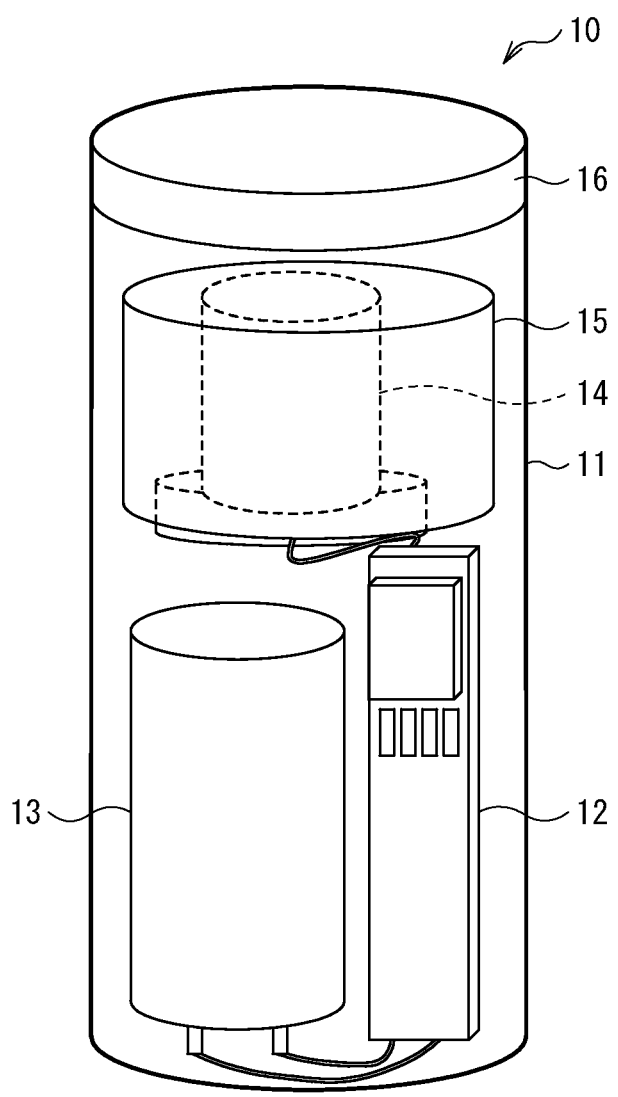

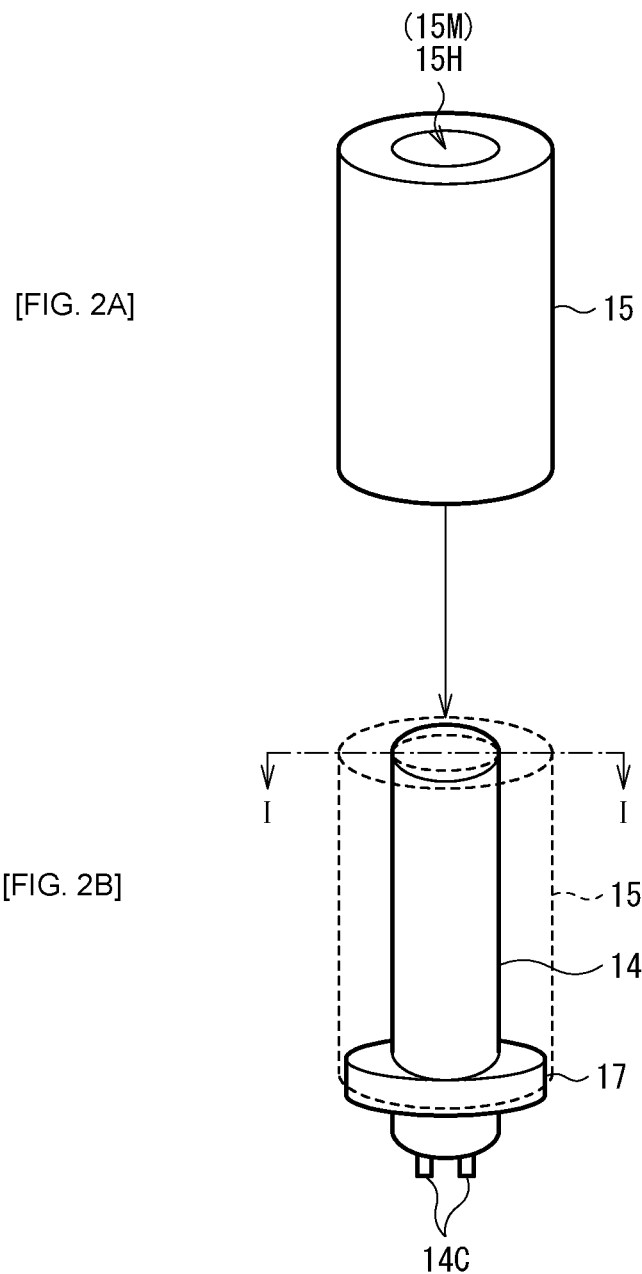

[FIG. 3]
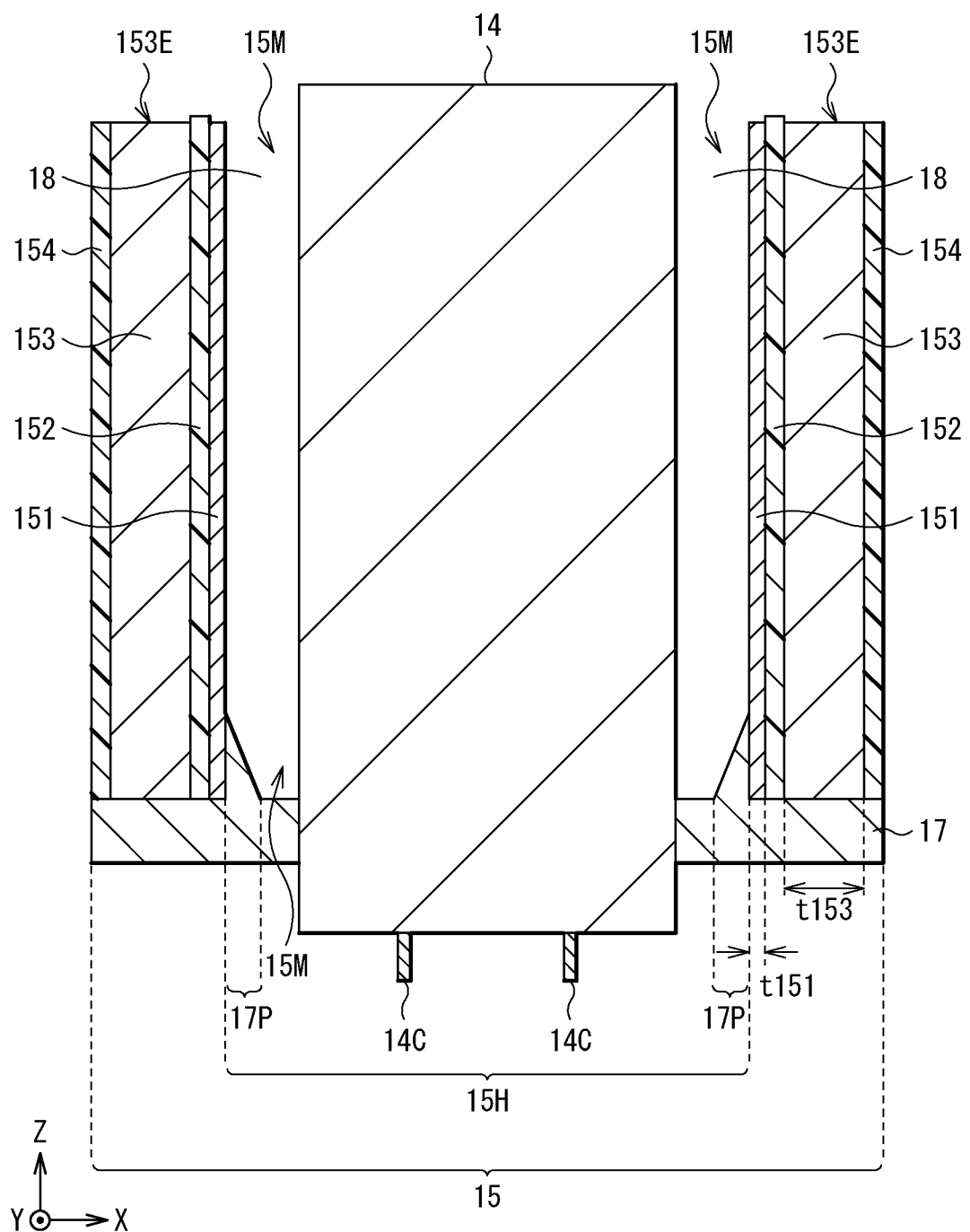

[FIG. 4]
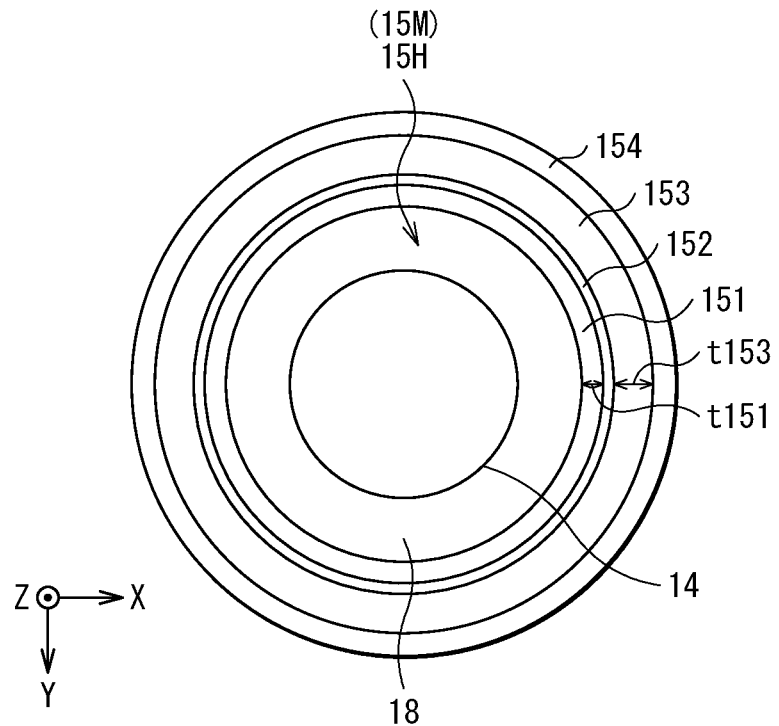
[FIG. 5]
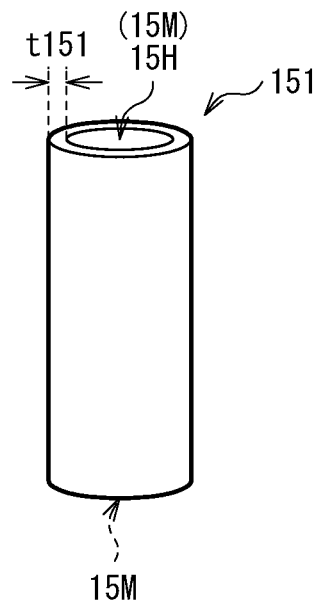

[FIG. 6A]
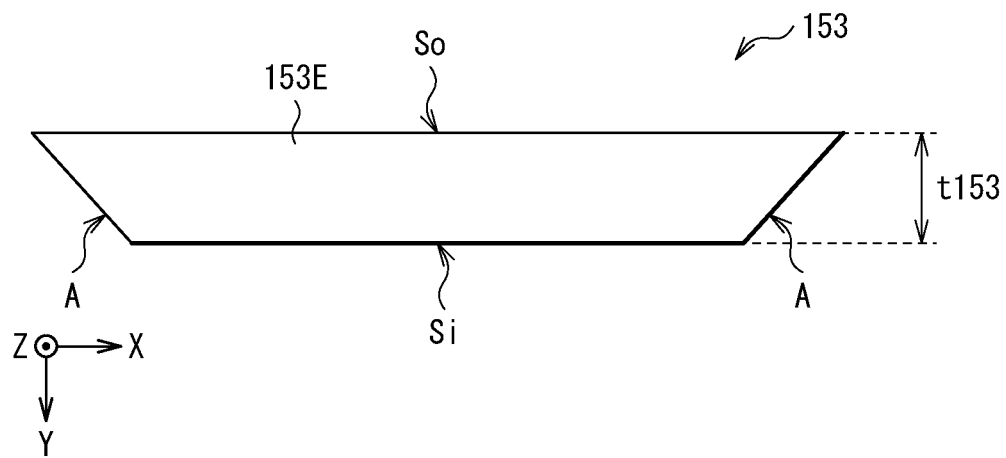
[FIG. 6B]
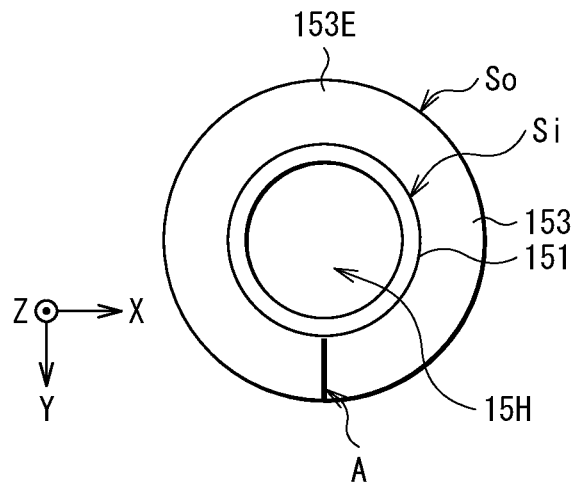

[FIG. 7A]
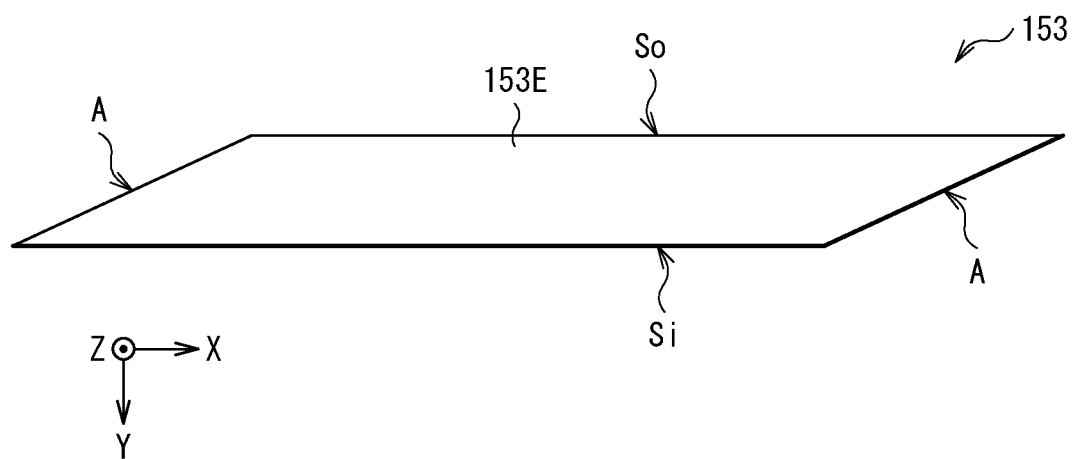
[FIG. 7B]
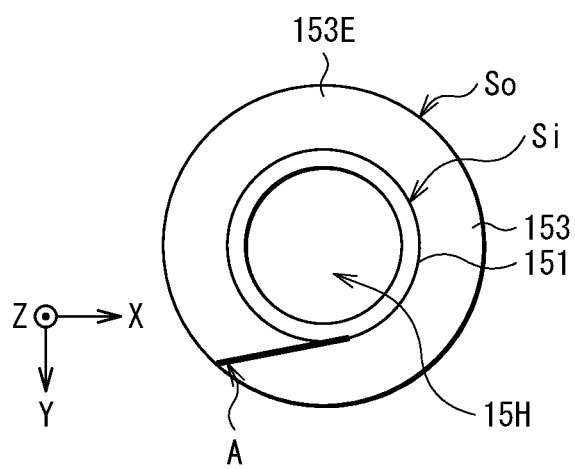

[FIG. 8A]
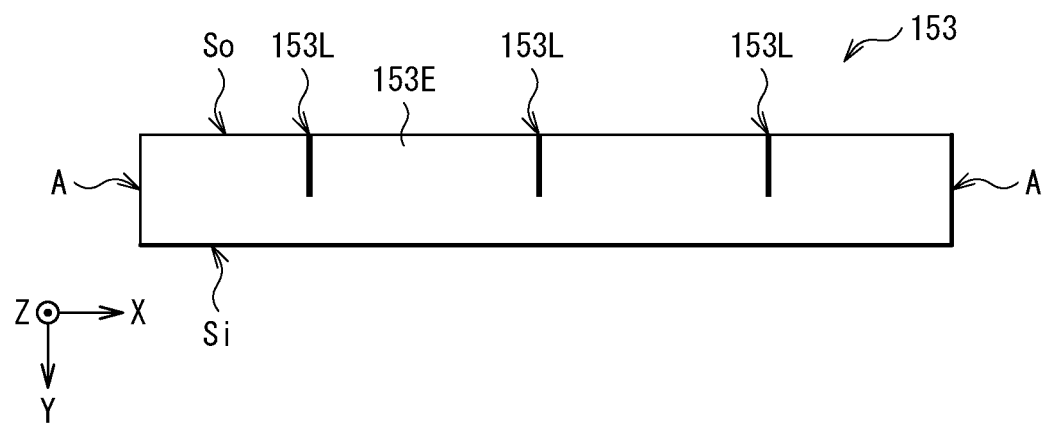
[FIG. 8B]
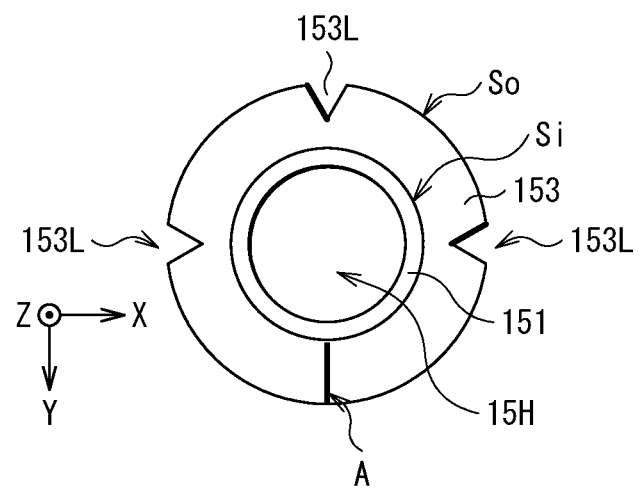

[FIG. 9]
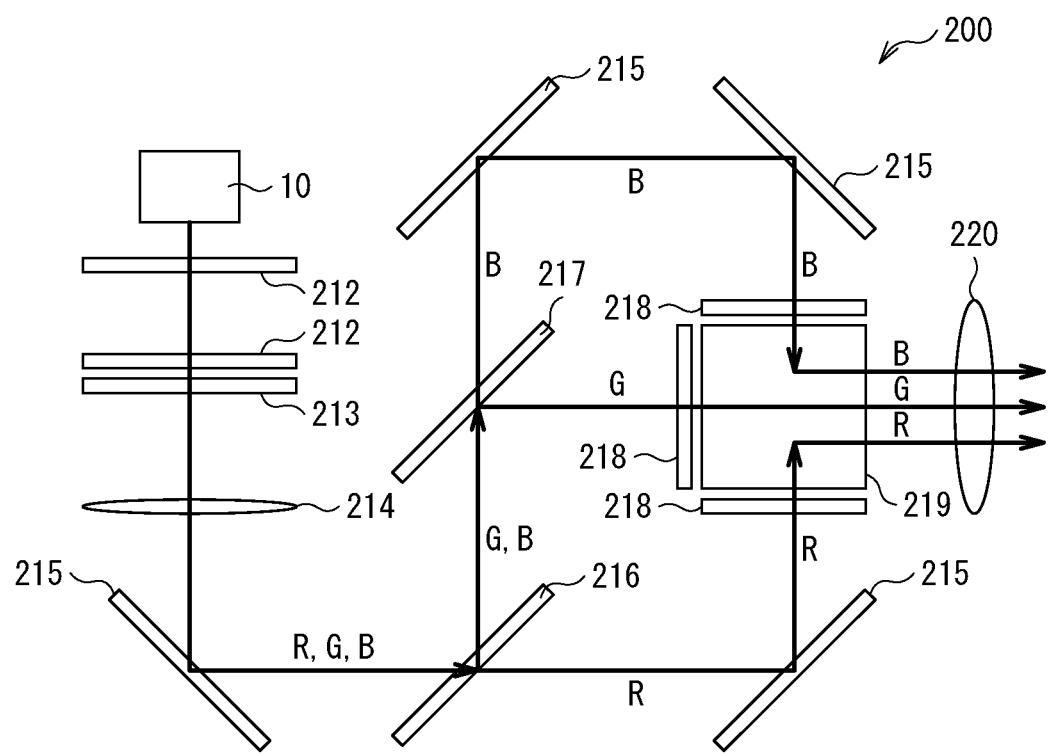

[FIG. 10]
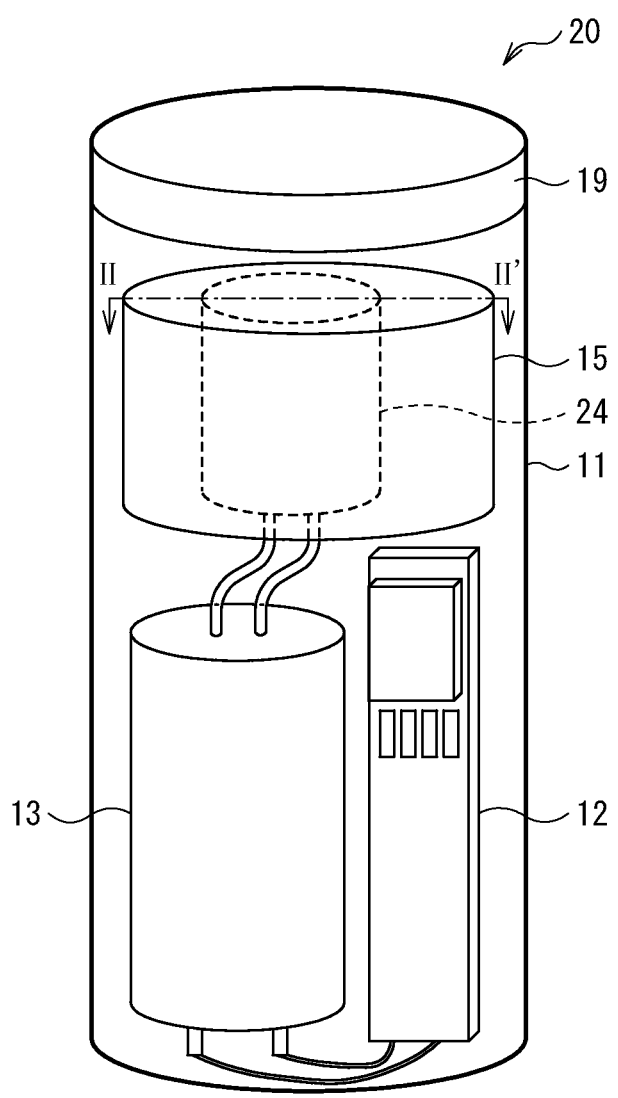

[FIG. 11A]
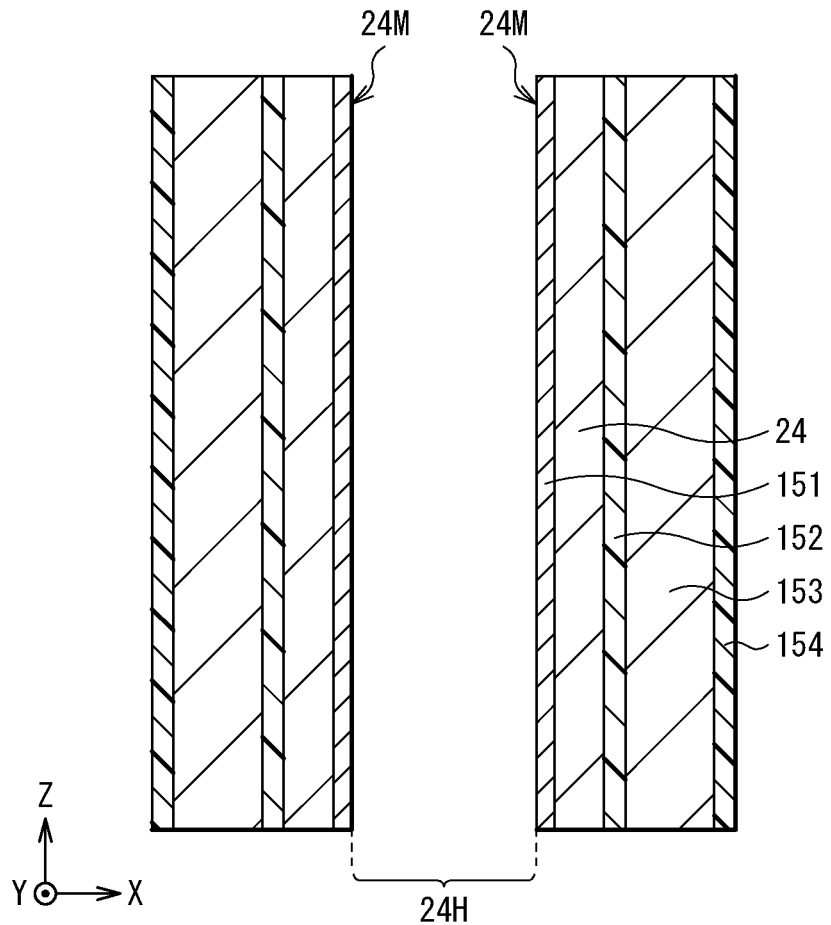
[FIG. 11B]
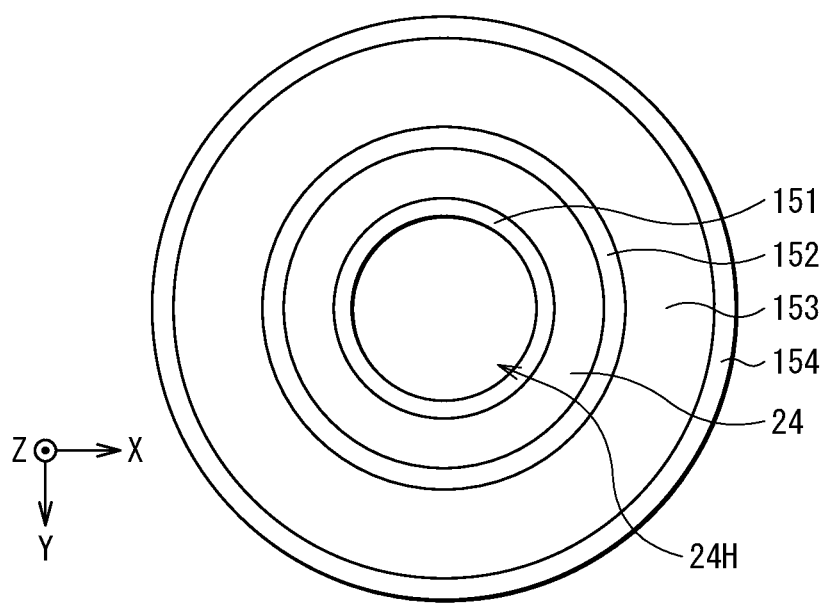

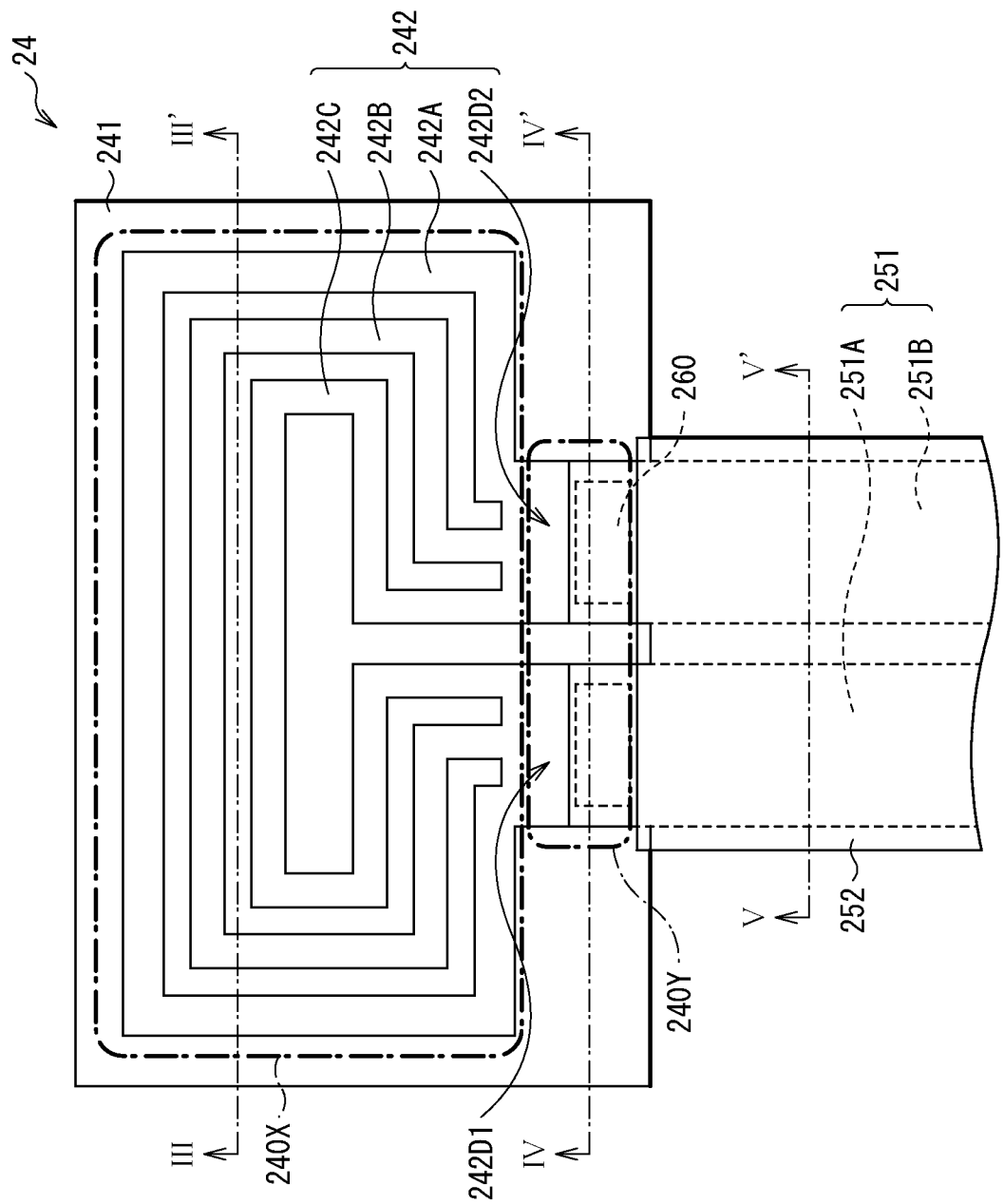
[FIG. 12]

[FIG. 13A]
[FIG. 13B]
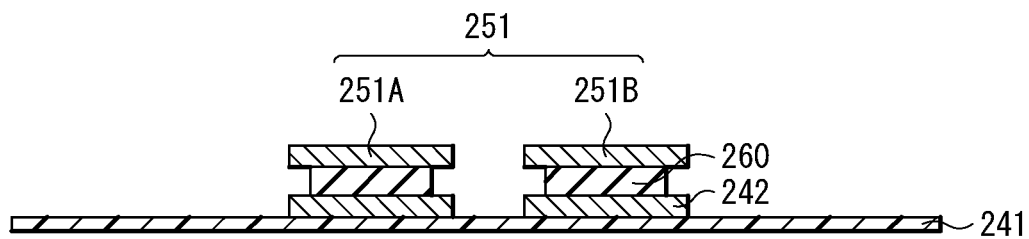
[FIG. 13C]
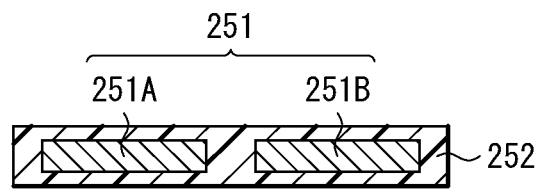

[FIG. 14A]
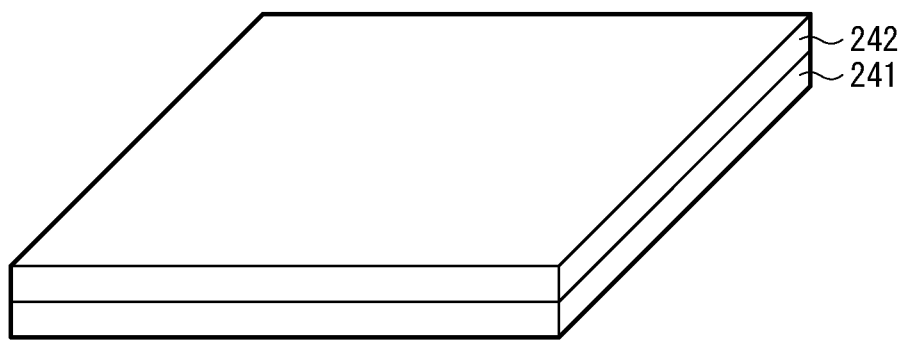
[FIG. 14B]
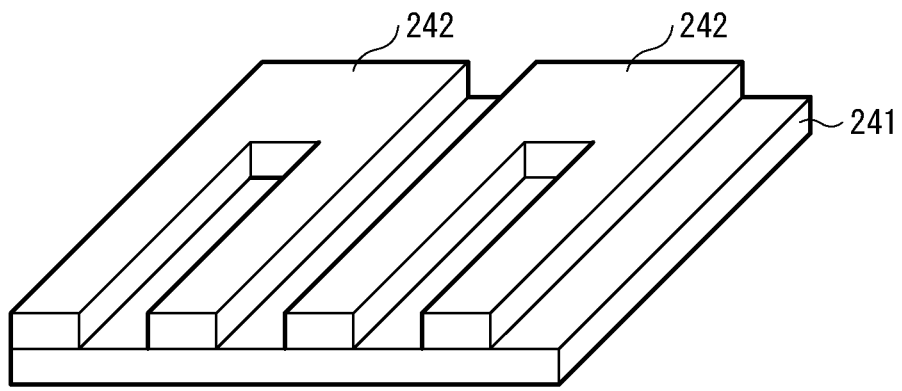
[FIG. 14C]
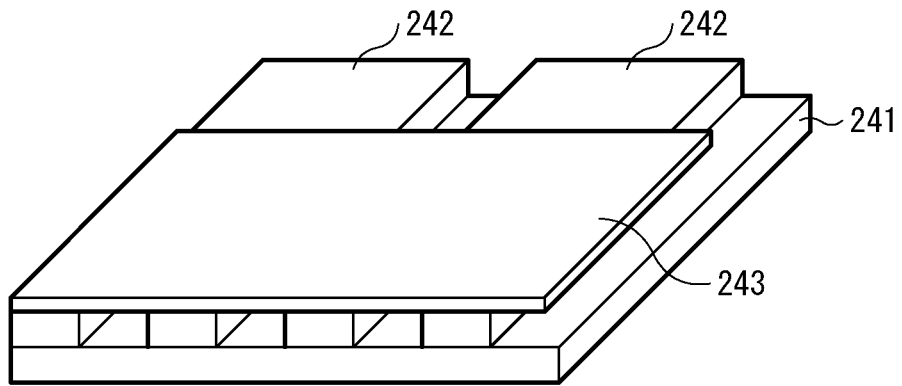

[FIG. 15A]
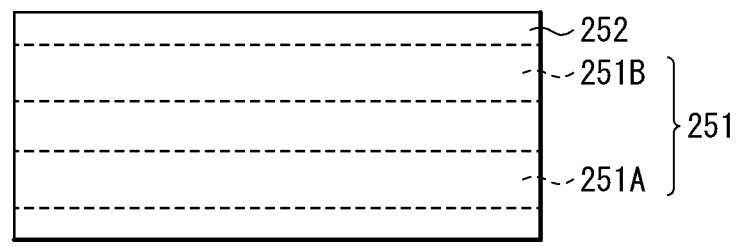
[FIG. 15B]
[FIG. 16]
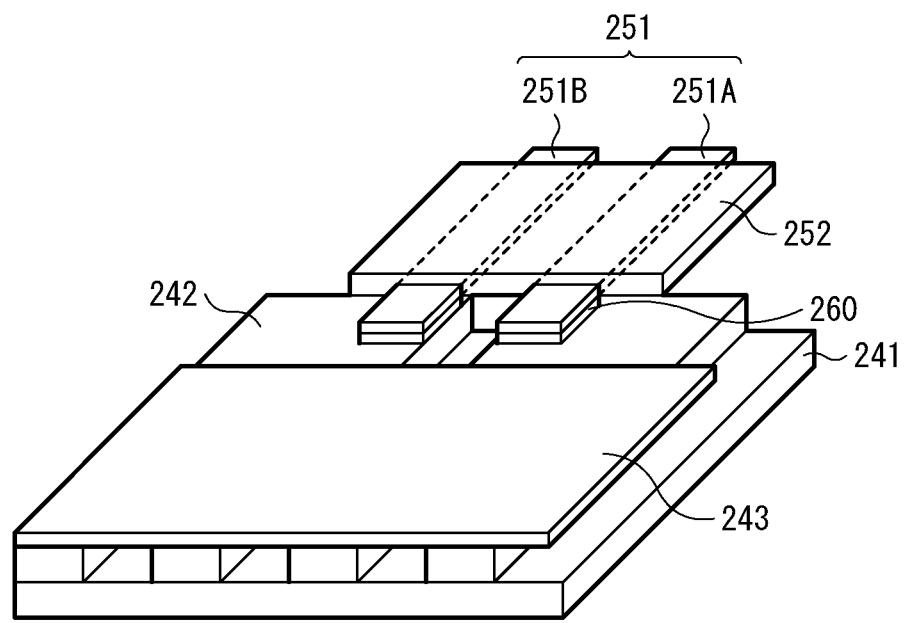

[FIG. 17]
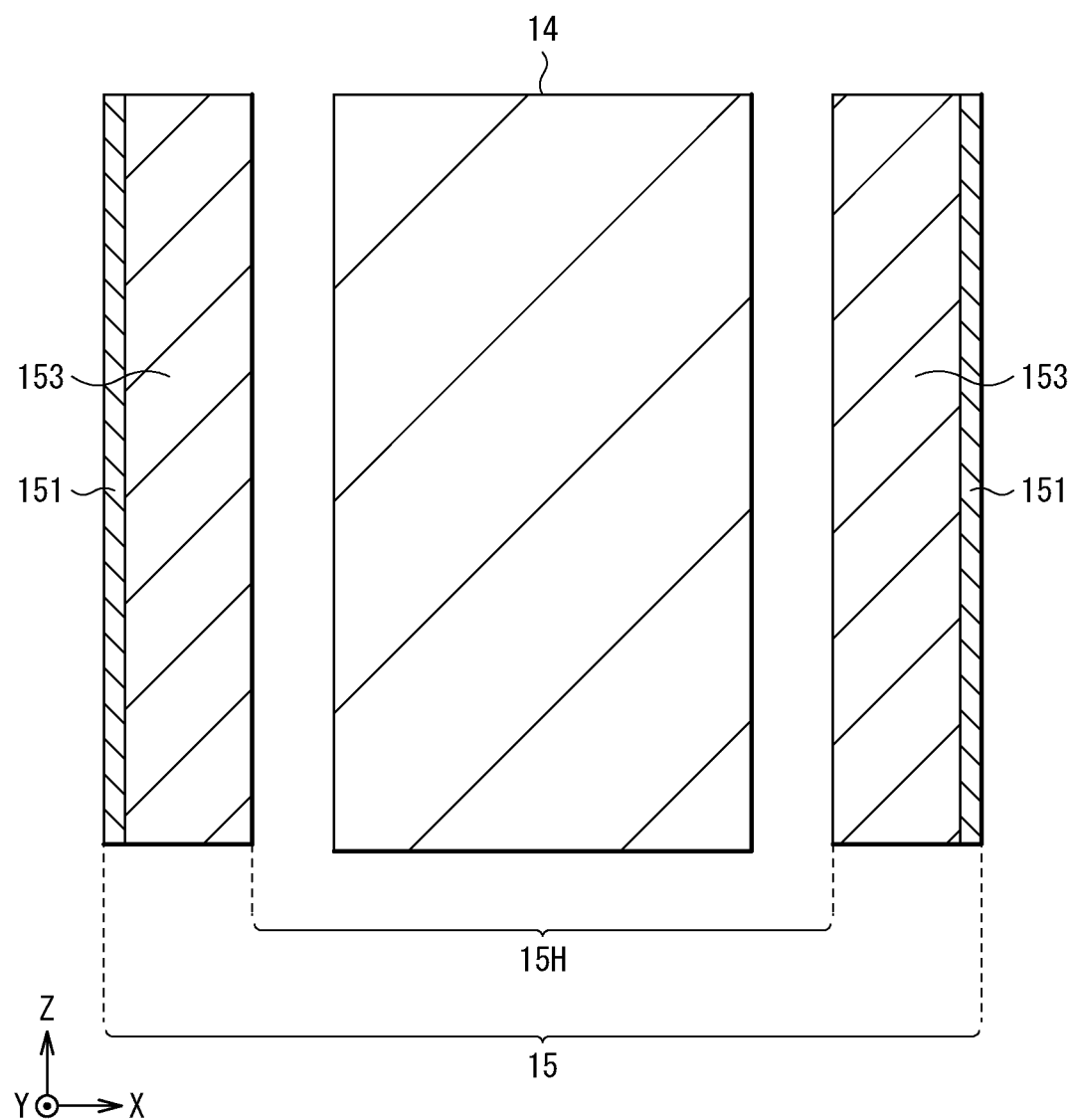

[FIG. 18A]
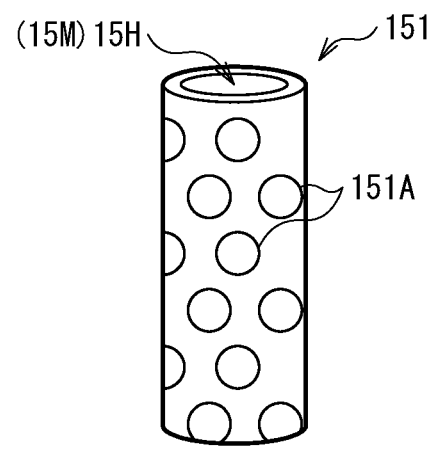
[FIG. 18B]
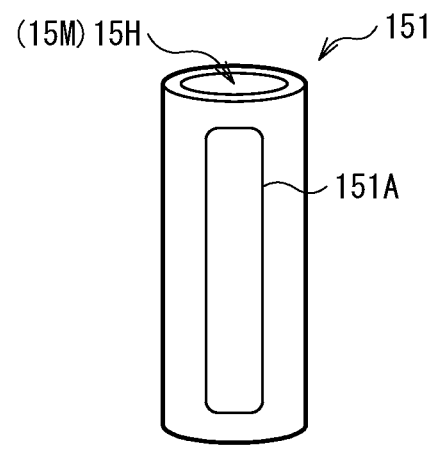
[FIG. 18C]
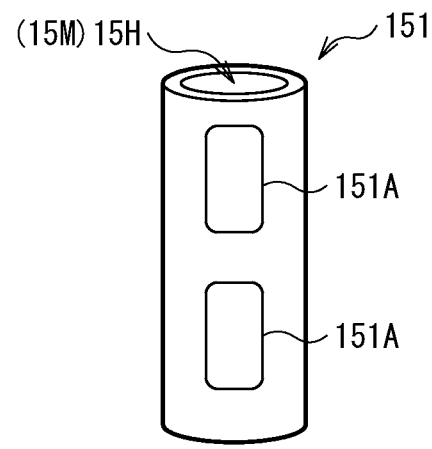

HEAT INSULATION STRUCTURE AND ELECTRONIC APPARATUS

CROSS REFERENCE TO RELATED APPLICATIONS

This application is a U.S. National Phase of International Patent Application No. PCT/JP2020/022927 filed on Jun. 10, 2020, which claims priority benefit of Japanese Patent Application No. JP 2019-200073 filed in the Japan Patent Office on Nov. 1, 2019 and also claims priority benefit of Japanese Patent Application No. JP 2019-114488 filed in the Japan Patent Office on Jun. 20, 2019. Each of the above-referenced applications is hereby incorporated herein by reference in its entirety.

TECHNICAL FIELD

The present technology relates to a heat insulation structure and an electronic apparatus including the heat insulation structure.

BACKGROUND ART

In an electronic apparatus such as a projection display device, a heat source such as a light source is used, for example. Therefore, a method of reducing an increase in surrounding temperature due to the heat source has been proposed (e.g., PTL 1).

CITATION LIST

Patent Literature

PTL 1: Japanese Unexamined Patent Application Publication No. 2010-139635

SUMMARY OF THE INVENTION

In such an electronic apparatus, it is desired to suppress the influence of a heat source on its surroundings more effectively.

Therefore, it is desirable to provide a heat insulation structure that makes it possible to reduce the influence of a heat source on its surroundings more effectively, and an electronic apparatus including the heat insulation structure.

A heat insulation structure according to one embodiment of the present technology includes: a heat source; a heat insulating member surrounding the heat source and having an opening; and a shape retaining member retaining a shape of the heat insulating member.

An electronic apparatus according to one embodiment of the present technology includes the heat insulation structure according to one embodiment of the present technology.

In the heat insulation structure and the electronic apparatus according to one embodiment of the present technology, the heat insulating member, and the shape retaining member retaining the shape of the heat insulating member are provided. This enables the shape of the heat insulating member to be retained so as to surround the heat source.

BRIEF DESCRIPTION OF DRAWINGS

FIG. 1 is a schematic diagram illustrating an exemplary configuration of a light-emitting device according to a first embodiment of the present technology.

FIG. 2A is a schematic perspective view of a configuration of a heat insulation structural body illustrated in FIG. 1, and FIG. 2B is a schematic perspective view of the heat insulation structural body illustrated in FIG. 2A together with a light source section.

FIG. 3 is a schematic diagram illustrating a cross-sectional configuration along line I-I' illustrated in of FIG. 2B.

FIG. 4 is a schematic diagram illustrating a planar configuration of the light source section and the heat insulation structural body illustrated in of FIG. 2B.

FIG. 5 is a schematic perspective view of an exemplary configuration of a shape retaining member illustrated in FIG. 3 and the like.

FIG. 6A is a schematic diagram illustrating an exemplary configuration before a heat insulating member illustrated in FIG. 3 and the like is wrapped around the shape retaining member.

FIG. 6B is a schematic diagram illustrating a configuration after the heat insulating member illustrated in FIG. 6A is wrapped around the shape retaining member.

FIG. 7A is a schematic diagram illustrating another example (1) of the configuration of the heat insulating member illustrated in FIG. 6A.

FIG. 7B is a schematic diagram illustrating a configuration after the heat insulating member illustrated in FIG. 7A is wrapped around the shape retaining member.

FIG. 8A is a schematic diagram illustrating another example (2) of the configuration of the heat insulating member illustrated in FIG. 6A.

FIG. 8B is a schematic diagram illustrating a configuration after the heat insulating member illustrated in FIG. 8A is wrapped around the shape retaining member.

FIG. 9 is a diagram illustrating an exemplary configuration of a projection display device to which the light-emitting device illustrated in FIG. 1 and the like is applied.

FIG. 10 is a schematic diagram illustrating an exemplary configuration of a heating device according to a second embodiment of the present disclosure.

FIG. 11A is a schematic diagram illustrating a cross-sectional configuration of a heater and the heat insulation structural body along line II-IT illustrated in FIG. 10.

FIG. 11B is a schematic diagram illustrating a planar configuration of the heater and the heat insulation structural body illustrated in FIG. 10.

FIG. 12 is a plane schematic diagram explaining a configuration of the heater illustrated in FIG. 10.

FIG. 13A is a schematic diagram illustrating a cross-sectional configuration along line III-III' illustrated in FIG. 12.

FIG. 13B is a schematic diagram illustrating a cross-sectional configuration along line IV-IV' illustrated in FIG. 12.

FIG. 13C is a schematic diagram illustrating a cross-sectional configuration along line V-V' illustrated in FIG. 12.

FIG. 14A is a diagram explaining a step of manufacturing the heater illustrated in FIG. 12.

FIG. 14B is a diagram illustrating a step following FIG. 14A.

FIG. 14C is a diagram illustrating a step following FIG. 14B.

FIG. 15A is a diagram illustrating a step following FIG. 14C.

FIG. 15B is a diagram illustrating a step following FIG. 15A.

FIG. 16 is a diagram illustrating a step following FIG. 15B.

FIG. 17 is a schematic diagram illustrating another exemplary cross-sectional configuration of the heat insulation structural body illustrated in FIG. 3.

FIG. 18A is a perspective view of another example (1) of the configuration of the shape retaining member illustrated in FIG. 5.

FIG. 18B is a perspective view of another example (2) of the configuration of the shape retaining member illustrated in FIG. 5.

FIG. 18C is a perspective view of another example (3) of the configuration of the shape retaining member illustrated in FIG. 5.

MODES FOR CARRYING OUT THE INVENTION

In the following, description is given of embodiments of the present technology in detail with reference to the drawings. The following description is merely a specific example of the present disclosure, and the present disclosure should not be limited to the following embodiments. Moreover, the present disclosure is not limited to arrangements, dimensions, dimensional ratios, and the like of each component illustrated in the drawings. It is to be noted that the description is given in the following order.
1. First Embodiment (an example of a light-emitting device in which a heat insulating member is provided around a heat source)
1-1. Overall Configuration of Light-Emitting Device
1-2. Specific Configuration of Heat Insulation Structural Body
1-3. Workings and Effects
2. Application Example (an example of a projection display device)
3. Second Embodiment (an example of a heating device in which a heat insulating member is provided around a heat source)
3-1. Overall Configuration of Heating Device
3-2. Configuration of Heater
3-3. Method of Manufacturing Heater
3-4. Workings and Effects 1. First Embodiment 1-1. Overall Configuration of Light-Emitting Device FIG. 1 is a schematic diagram illustrating an exemplary configuration of a light-emitting device (a light-emitting device 10) according to a first embodiment of the present technology. The light-emitting device 1 is applied to, for example, a projection display device (e.g., a projection display device 200 in FIG. 9 to be described later). The light-emitting device 10 includes, for example, an exterior member 11, a controller 12, a battery 13, a light source section 14, a heat insulation structural body 15, and a transparent plate 16. Here, the light source section 14 corresponds to a specific example of a "heat source" of the present technology.

The exterior member 11 houses the controller 12, the battery 13, the light source section 14, and the heat insulation structural body 15. For example, the exterior member 11 has a cylindrical shape. Inside the cylinder, the controller 12, the battery 13, the light source section 14, and the heat insulation structural body 15 are housed. One side (the upper side of the paper surface in FIG. 1) of the exterior member 11 is open, and the transparent plate 16 is provided on this opening. The exterior member 11 includes plastic, for example. Examples of the plastic include ABS (Acrylonitrile Butadiene Styrene) resin, PC (Poly Carbonate)/ABS resin, nylon, and the like. The exterior member 11 may include a metal such as an aluminum alloy (e.g., A1050, A5052), magnesium (Mg), and SUS (Steel Use Stainless).

The controller 12 housed in the exterior member 11 is electrically coupled to the battery 13 and the light source section 14. The controller 12 includes, for example, a wiring board and an IC (Integrated Circuit) mounted on the wiring board. The controller 12 inputs a drive signal to the light source section 14 in response to a signal inputted from the outside, for example. A lighting state of the light source section 14 is controlled in response to the drive signal from the controller 12. Power is supplied to the controller 12 by the battery 13.

The light source section 14 is lit, by the drive signal inputted from the controller 12, to generate light. The light source section 14 includes a connector 14C (illustrated in of FIG. 2B to be described later) at one end, for example, and is coupled to the controller 12 via the connector 14C. The light source section 14 includes, for example, a laser, an LED (Light Emitting Diode), or the like. Alternatively, the light source section 14 may include a discharge lamp such as a metal halide lamp, a high-pressure mercury lamp, a halogen lamp, and a xenon lamp. From the light source section 14, heat is generated with light, for example. Temperature in the vicinity of the light source section 14 may become, for example, about 70° C. to about 300° C. Here, the light source section 14 corresponds to a specific example of the heat source of the present technology.

The heat insulation structural body 15 is provided in the vicinity of the light source section 14. The heat insulation structural body 15 is provided to surround the light source section 14, and the light generated by the light source section 14 is taken out via an opening (an opening 15M in of FIG. 2A to be described later) of the heat insulation structural body 15. The heat insulation structural body 15 makes the heat generated by the light source section 14 less likely to be transferred to the surroundings, making it possible to suppress an increase in the temperature around the light source section 14. A specific configuration of the heat insulation structural body 15 will be described later.

The transparent plate 16 has a circular planar shape, for example. The transparent plate 16 has, for example, substantially the same size as a circle configuring a bottom surface of the cylindrical exterior member 11. The opening of the exterior member 11 is closed by the transparent plate 16. The transparent plate 16 has high transparency to light of a wavelength band generated in the light source section 14, and the light of the light source section 14 taken out via the opening of the heat insulation structural body 15 is taken out to the outside through the transparent plate 16.

1-2. Specific Configuration of Heat Insulation Structural Body

Next, a specific configuration of the heat insulation structural body 15 will be described with reference to FIGS. 2A, 2B, 3, and 4. FIG. 2A is a schematic perspective view of the configuration of the heat insulation structural body 15, and FIG. 2B is a perspective view of the configuration of the heat insulation structural body 15 together with the light source section 14. In FIG. 2B, the heat insulation structural body 15 is represented by a broken line. FIG. 3 illustrates a cross-sectional configuration along line I-I' in FIG. 2B. FIG. 4 is a plan view of the configuration of the heat insulation structural body 15 together with the light source section 14.

The heat insulation structural body 15 has a cylindrical shape, for example, and has a hole 15H penetrating from the middle of one bottom surface to the middle of the other bottom surface. In other words, the one bottom surface and the other bottom surface of the heat insulation structural body 15 are provided with the opening 15M leading to the hole 15H. The light source section 14 is inserted into the hole 15H of the heat insulation structural body 15 FIGS. 2A and 2B). That is, the heat insulation structural body 15 configures a side surface of the cylinder, and the light source section 14 is surrounded by the side surface of the cylinder. The light taken out from the one opening 15M of the heat insulation structural body 15 is emitted via the transparent plate 16. An air space 18 is interposed between the light source section 14 and the heat insulation structural body 15 (FIG. 3). The heat insulation structural body 15 includes, for example, a shape retaining member 151, a bonding layer 152, a heat insulating member 153, and a fixing member 154, in order from the hole 15H (air space 18) side.

FIG. 5 is a schematic perspective view of an exemplary configuration of the shape retaining member 151. The shape retaining member 151 is configured to retain a shape of the heat insulating member 153. For example, the shape of the heat insulating member 153 is formed along an outer shape of the shape retaining member 151. The shape retaining member 151 has a cylindrical shape, for example, and the shape of the heat insulating member 153 is retained by the sheet-shaped heat insulating member 153 being wrapped around the shape retaining member 151. The hole 15H and the opening 15M of the heat insulation structural body 15 are provided in the shape retaining member 151. In other words, the shape of the shape retaining member 151 allows the shape of the heat insulation structural body 15 to be adjusted.

The shape retaining member 151 includes, for example, a metallic material such as SUS (Steel Use Stainless). The metallic material included in the shape retaining member 151 preferably has a light-reflecting property. By configuring the shape retaining member 151 with a metallic material having a light-reflecting property, the heat generated by the light source section 14 is easily reflected by the shape retaining member 151. This makes the heat generated by the light source section 14 less likely to be transferred to the outside of the heat insulation structural body 15. Further, because the metallic material has relatively high stiffness, it is possible to reduce a thickness (a thickness t151 in FIGS. 3 to 5) of the shape retaining member 151. The thickness t151 of the shape retaining member 151 is, for example, 0.5 mm or less. For example, in a case of applying the light-emitting device 10 to a small electronic apparatus, such as a small projection display device, the shape retaining member 151 preferably includes a metal.

The shape retaining member 151 may include a resin material, for example. Because the resin material has relatively low heat conductivity, it is possible to improve heat insulation performance of the heat insulation structural body 15, for example, as compared with the case of configuring the shape retaining member 151 with a metallic material. Further, the resin material is relatively inexpensive. In a case where it is unnecessary to make the heat insulation structural body 15 smaller, for example, in a case of applying the light-emitting device 10 to a large electronic apparatus, the shape retaining member 151 including a resin material is suitably used.

The bonding layer 152 is provided, for example, between the shape retaining member 151 and the heat insulating member 153. For example, the heat insulating member 153 is fixed to the shape retaining member 151 by the bonding layer 152. The bonding layer 152 includes an adhesive including a resin material, for example. The bonding layer 152 may include a tape or the like. Alternatively, the bonding layer 152 may not be provided between the shape retaining member 151 and the heat insulating member 153. In this case, the heat insulating member 153 is fixed to the shape retaining member 151 by the fixing member 154.

The heat insulating member 153 bonded to the shape retaining member 151 via the bonding layer 152 has a heat conductivity of 0.04 W/m·k or less, for example, under a 20° C. environment. The heat insulating member 153 makes the heat generated by the light source section 14 less likely to be transferred to the outside of the heat insulation structural body 15. That is, the heat insulating member 153 mainly serves a heat insulation function in the heat insulation structural body 15. In the present embodiment, the heat insulating member 153 is retained in a shape surrounding the light source section 14 by the shape retaining member 151. As will be described in detail later, this makes it possible to suppress the influence of the light source section 14 on its surroundings more effectively.

The heat insulating member 153 has a sheet-shape, for example, and is disposed to follow the outer shape of the shape retaining member 151. That is, the heat insulating member 153 continuously surrounds the light source section 14 by the side surface of the cylinder. The heat insulating member 153 is provided with the opening (the opening 15M of the heat insulation structural body 15) at a position corresponding to the bottom surface of the cylinder. That is, the heat insulating member 153 has a pair of openings opposed to each other with the light source section 14 therebetween. The light generated by the light source section 14 is taken out via one of the pair of openings. Providing the heat insulating member 153 with such an opening makes the light generated by the light source section 14 available, which enhances the flexibility in arrangement of parts.

The heat insulating member 153 has a thickness (a thickness t153 in FIGS. 3 and 4) of, for example, 5.0 mm or less. In particular, in a case of applying the light-emitting device 10 to a small electronic apparatus, it is preferable that the thickness t153 of the heat insulating member 153 be 5.0 mm or less, because a gap between the parts is also reduced. In a case where the temperature of the light source section 14 is 300° C. or less, the heat insulating member 153 with the thickness t153 of 2.0 mm or less may be used. For example, the heat insulating member 153 may be configured by overlapping a plurality of sheets having a thickness of about 0.1 mm. Configuring the heat insulating member 153 by overlapping a plurality of sheets makes it easier to adjust the thickness t153 of the heat insulating member 153.

The sheet-shaped heat insulating member 153 has an end face 153E (FIG. 3) on one opening side and the other opening side. For example, the end face 153E on the one opening side is exposed to be in contact with the air. As will be described in detail later, it is easy to make the heat insulation structural body 15 smaller, because the heat insulating member 153 is not made airtight in the heat insulation structural body 15. The end face 153E may be covered with another member, for example, or may be coated with a resin material or the like.

FIG. 6A illustrates a configuration of the end face 153E of the heat insulating member 153 in a state before being wrapped around the shape retaining member 151. FIG. 6B illustrates a configuration of the cylindrical shape retaining member 151 and the heat insulating member 153 wrapped around the shape retaining member 151. The end face 153E of the heat insulating member 153 has an inner peripheral side Si provided on the shape retaining member 151 side, and an outer peripheral side So provided on the fixing member 154 side. When the heat insulating member 153 is wrapped around the shape retaining member 151, both sides in an extending direction (X-axis direction) of the end face 153E meet (a meeting portion A). For example, the end face 153E of the heat insulating member 153 may be substantially trapezoidal. In this case, for example, the inner peripheral side Si is substantially the same size as the circumference of the cylindrical shape retaining member 151, and the outer peripheral side Si is larger than the inner peripheral side Si. This makes it easier to wrap the heat insulating member 153 around the shape retaining member 151.

FIGS. 7A and 8A illustrate other examples (other examples (1) and (2)) of the configuration of the end face 153E of the heat insulating member 153 illustrated in FIG. 6A. FIGS. 7B and 8B illustrate other examples (other examples (1) and (2)) of the configuration of the heat insulating member 153 illustrated in FIG. 6B. As illustrated in FIG. 7A, the end face 153E of the heat insulating member 153 may substantially be a parallelogram. In this case, for example, the meeting portion A is formed to deviate from a diametrical direction of the shape retaining member 151, as illustrated in FIG. 7B. Alternatively, the end face 153E of the heat insulating member 153 may be rectangular (not illustrated). Further, as illustrated in FIG. 8A, a slit 153L may be provided on the heat insulating member 153 in a direction from the outer peripheral side So toward the inner peripheral side Si. By providing the slit 153L, the slit 153L expands on the outer peripheral side So (FIG. 8B) when the heat insulating member 153 is wrapped around the shape retaining member 151, making it possible to reduce stress on the outer peripheral side So side. This makes it easier to wrap the heat insulating member 153 around the shape retaining member 151. The slit 153L has a depth that is, for example, about ⅓ of the thickness t153 of the heat insulating member 153. For example, three slits 153L are provided on the heat insulating member 153.

The heat insulating member 153 preferably includes an aerogel, for example. Examples of the aerogel include silica aerogel. The heat insulating member 153 including the aerogel has excellent heat insulation performance. Further, the heat insulating member 153 including the aerogel reduces most of the three influences of convection, radiation, and heat conductivity. Such a heat insulating member 153 is easily reduced in its thickness t153. Therefore, the heat insulating member 153 including the aerogel may be suitably used for a small electronic apparatus.

The air space 18 is provided between the heat insulating member 153 and the light source section 14, specifically, between the shape retaining member 151 and the light source section 14. The air space 18 also provides heat insulation. Therefore, providing the air space 18 between the heat insulating member 153 and the light source section 14 makes it easier to adjust a heat resistance temperature of the heat insulating member 153. For example, the air space 18 is adjusted to a predetermined size by performing positioning between the shape retaining member 151 and the light source section 14.

The light-emitting device 1 includes, for example, a locking member 17 configured to perform positioning between the heat insulation structural body 15 and the light source section 14, specifically, positioning between the shape retaining member 151 and the light source section 14 (FIG. 3). The locking member 17 is an annular member, for example, and is mounted in a flanged shape on the light source section 14 FIG. 2B). For example, the position of the heat insulation structural body 15 with respect to the light source section 14, i.e., the position of the heat insulating member 153 with respect to the light source section 14, is fixed by a projection 17P, provided on the inner periphery of the locking member 17, catching the shape retaining member 151 from the other opening 15M of the heat insulation structural body 15. The locking member 17 preferably includes a material having a low heat conductivity, and includes, for example, a resin material or the like with a heat conductivity of 1.0 W/m·k or less. Examples of such a resin material include engineering plastics such as PEEK (polyether ether ketone) and PPS (polyphenylene sulfide). Here, a portion where the projection 17P and the shape retaining member 151 contact each other corresponds to a specific example of a positioning section of the present technology. Positioning of the heat insulating member 153 with respect to the light source section 14 may be performed by another method. For example, a recess may be provided on the locking member 17, a projection may be provided on the shape retaining member 151, and the recess and the projection may be fitted together.

The fixing member 154 is configured to fix the heat insulating member 153 to the shape retaining member 151. For example, the outer periphery of the heat insulating member 153 is supported by the fixing member 154. A shrinkable tube may be used, for example, for the fixing member 154. In this case, the heat insulating member 153 is fixed to the shape retaining member 151 by shrinkage force of the shrinkable tube. For example, when the heat insulating member 153 is wrapped around the shape retaining member 151, the thickness of the heat insulating member 153 at the meeting portion A (e.g., FIG. 7B and the like) may be larger than the thickness of the heat insulating member 153 at another portion. In this case, by using the shrinkable tube for the fixing member 154, it is possible to compress the thickness of the heat insulating member 153 at the meeting portion A to the same extent as the thickness of the heat insulating member 153 at the other portion. The fixing member 154 may be, for example, a pipe-shaped part covering the outer periphery of the heat insulating member 153. For example, the fixing member 154 may include a pipe of a metal such as stainless steel. Alternatively, the fixing member 154 may be a tape including a resin material such as polyimide. On the fixing member 154, aluminum (Al) or the like may be deposited, for example. This makes it possible to reduce emissivity of heat from the heat insulation structural body 15.

1-3. Workings and Effects

The heat insulation structural body 15 included in the light-emitting device 10 of the present embodiment is provided with the heat insulating member 153, and the shape retaining member 151 retaining the shape of the heat insulating member 153. This enables the shape of the heat insulating member 153 to be retained so as to surround the light source section 14.

For example, in a case where the shape retaining member is not provided in the heat insulation structural body, it is difficult to freely adjust the shape of the sheet-shaped heat insulating member. Therefore, the heat insulating member is disposed only in one direction of the heat source, and an increase in temperature caused by the heat source is likely to occur in a direction other than the direction in which the heat insulating member is provided. Therefore, parts with low heat resistance have to be disposed sufficiently away from the heat source. Such a heat insulation structural body without a shape retaining member is difficult to apply to a small device.

Also conceivable are a method of performing heat insulation by evacuating the inside of an airtight container, and a method of performing heat insulation by filling the airtight container with an aerogel. The airtight container has, for example, an inner wall on the heat source side, an outer wall opposed to the inner wall, and a connection portion coupling the inner wall and the outer wall. Such an airtight container involves a concern that, when heat is transferred from the heat source to the inner wall, this heat is transferred to the outer wall via the connection portion, i.e., the concern of a heat bridge structure. In the heat bridge structure, in order to perform sufficient heat insulation, it is necessary to radiate heat by making a heat transfer path longer. This makes the airtight container larger. Therefore, a heat insulation structural body with such an airtight container is also difficult to apply to a small device. In particular, an airtight container for retaining the vacuum state includes a material having high heat conductivity, which tends to make the airtight container larger. A metallic material, a glass material, or the like is often used for the airtight container for retaining the vacuum state in order to suppress transmission of gas therethrough.

Such an airtight container is unnecessary in a case of using a foamed resin such as urethane foam and melamine foam as the heat insulating member. However, such a heat insulating member is intended mainly to prevent convective heat transfer, which tends to make the heat insulating member thicker. Therefore, such a heat insulating member including a foamed resin is also difficult to apply to a small device.

In contrast, the heat insulation structural body 15 of the light-emitting device 1 includes the shape retaining member 151, which makes it possible to retain the shape of the heat insulating member 153 so as to surround the light source section 14. Therefore, the vicinity of the light source section 14 is heat-insulated more effectively, as compared with the case of providing the heat insulating member 153 in only one direction of the light source section 14. This makes it possible to suppress the influence of the light source section 14 on its surroundings more effectively, allowing even parts with low heat resistance to be disposed closer to the light source section 14. That is, the heat insulation structural body 15 may be suitably used for a small device. Further, by the heat insulation structural body 15 including the shape retaining member 151, it is easy to maintain the dimensions of the heat insulating member 153 stably.

Furthermore, in the heat insulation structural body 15, one end face 153E of the heat insulating member 153 is exposed. That is, the heat insulation structural body 15 does not have the heat bridge structure, and it is unnecessary to make the heat transfer path longer. This makes it easier to make the heat insulation structural body 15 smaller and apply it to a small device. Further, because such a heat insulation structural body 15 is manufactured under normal temperature and normal pressure, it may be easily manufactured as compared with a heat insulation structural body that evacuates the inside of an airtight container.

Further, because the heat insulating member 153 of the heat insulation structural body 15 includes an aerogel, it is easily reduced in its thickness t153, as compared with the heat insulating member 153 including a foamed resin. Therefore, the use of the aerogel for the heat insulating member 153 makes the heat insulation structural body 15 smaller and easier to apply to a small device.

As described above, in the present embodiment, the heat insulating member 153 is provided to surround the light source section 14. This enables the vicinity of the light source section 14 to be heat-insulated more effectively, as compared with the case of providing the heat insulating member only in one direction of the heat source. This makes it possible to suppress the influence of the light source section 14 on its surroundings more effectively. Such a heat insulation structural body 15 makes it easier to dispose parts in the vicinity of the light source section 14, and therefore is suitably used for a small device.

Further, in the light-emitting device 10 including such a heat insulation structural body 15, the designing flexibility of parts is enhanced. For example, it is possible to use a part including a resin with low heat resistance in the vicinity of the light source section 14. This makes it possible to suppress cost for the parts.

2. Application Example

The light-emitting device 10 described in the first embodiment may be applied, for example, to an electronic apparatus such as a projection display device.

FIG. 9 is a diagram illustrating an exemplary configuration of a projection display device (the projection display device 200) to which the light-emitting device 10 is applied. The projection display device 200 is, for example, a display device that projects an image on a screen. The projection display device 200 is coupled, via an I/F (interface), to a computer such as a PC or an external image supplying device such as various image players, for example, and performs projection on a screen or the like on the basis of an image signal inputted to the I/F. Note that the configuration of the projection display device 200 described below is an example. The projection display device according to the present technology is not limited to such a configuration.

The projection display device 200 includes the light-emitting device 10, a multi-lens array 212, a PbS array 213, a focus lens 214, a mirror 215, dichroic mirrors 216 and 217, optical modulators 218a to 218c, a dichroic prism 219, and a projection lens 220.

In the light-emitting device 10, light emitted from a light-emitting element 121 passes through an array lens, and is taken out as collimating light. The light enters the multi-lens array 212. The multi-lens array 212 has a structure in which a plurality of lens elements are provided in an array, and condenses the light emitted from light-emitting devices 1 and 2. The PbS array 213 polarizes the light condensed by the multi-lens array 212 into light in a predetermined polarization direction, for example, P-polarized waves. The focus lens 214 condenses the light that has been converted into light in the predetermined polarization direction by the PbS array 213.

The dichroic mirror 216 transmits red light R, and reflects green light G and blue light B, of the light that has entered via the focus lens 214 and the mirror 215. The red light R transmitted by the dichroic mirror 216 is guided to the optical modulator 218a via the mirror 215.

The dichroic mirror 217 transmits the blue light B and reflects the green light G, of the light reflected by the dichroic mirror 216. The green light G reflected by the dichroic mirror 217 is guided to the optical modulator 218b.

On the other hand, the blue light B transmitted by the dichroic mirror 217 is guided to the optical modulator 218c via the mirror 215.

Each of the optical modulators 218a to 218c optically modulates the colored light beam that has entered, and causes the optically-modulated colored light beam to enter the dichroic prism 219. The dichroic prism 219 combines, into one optical axis, the colored light beams that have entered after being optically modulated. The combined colored light beams are projected onto a screen or the like via the projection lens 220.

In the projection display device 200, the three optical modulators 218a to 218c corresponding to three colors of red, green, and blue, which are three primary colors, are combined, and all colors are displayed. That is, the projection display device 200 is a so-called three-chip projection display device.

Next, a second embodiment of the present disclosure will be described. In the following description, the same components as those in the first embodiment are denoted with the same reference numerals, and descriptions thereof are omitted as appropriate.

3. Second Embodiment

3-1. Overall Configuration of Heating Device

FIG. 10 is a schematic diagram illustrating an exemplary configuration of a light-emitting device (a heating device 20) according to the second embodiment of the present technology. The heating device 20 is applied, for example, to an aroma diffuser, an electronic aroma furnace, and the like. The heating device 20 includes a heater 24, for example, and in addition, includes the exterior member 11, the controller 12, the battery 13, and the heat insulation structural body 15, as in the first embodiment. Further, the opening of the exterior member 11 is closed by a cap 19. Here, the heater 24 correspond to a specific example of the "heat source" of the present technology.

The cap 19 has a circular planar shape, for example. The cap 19 has, for example, substantially the same size as the circle configuring the bottom surface of the cylindrical exterior member 11. The opening of the exterior member 11 is closed by the cap 19. The cap 19 includes plastic, for example. Examples of the plastic include ABS (Acrylonitrile Butadiene Styrene) resin, PC (Poly Carbonate)/ABS resin, nylon, and the like. The cap 19 may include a metal such as an aluminum alloy (e.g., A1050, A5052), magnesium (Mg), and SUS (Steel Use Stainless).

The heater 24 generates heat by being applied with a current from the battery 13, for example, in response to a control signal inputted from the controller 12. Although a detailed configuration of the heater 24 will be described later, the heater 24 has a sheet-shape, for example, and includes a heat generator 240X and a connector 240Y. To the connector 240Y, a wiring line 251 electrically coupled to a pair of electrodes of the battery 13, for example, is coupled via solder 260 (see FIG. 12).

In the present embodiment, the heater 24 forms a cylindrical shape, for example, and has a hole 24H penetrating from one bottom surface to the other bottom surface. In other words, the one bottom surface and the other bottom surface of the heater 24 are provided with an opening 24M leading to the hole 24H.

Next, a specific configuration of the heater 24 and the heat insulation structural body 15 will be described with reference to FIGS. 11A and 11B. In the heating device 20, the heater 24 serving as a heat source is disposed between the shape retaining member 151 and the heat insulating member 153 included in the heat insulation structural body 15, and the shape of the heater 24 is formed along an outer diameter of the shape retaining member 151. The shape retaining member 151 has a cylindrical shape, for example, as in the first embodiment, and the shape of the heater 24 is retained by the sheet-shaped heater 24 being wrapped around the shape retaining member 151. The heat insulating member 153 is provided around the heater 24. Specifically, the bonding layer 152 is provided, for example, between the heater 24 and the heat insulating member 153, and the heat insulating member 153 is fixed to the heater 24 by the bonding layer 152. Alternatively, the bonding layer 152 may not be provided between the heater 24 and the heat insulating member 153. In this case, the heat insulating member 153 is fixed to the heater 24 by the fixing member 154. That is, the heater 24 and the heat insulating member 153 are in contact with each other directly or via the bonding layer 152.

Note that an aerogel incorporated with fluororesin, melamine resin, or silicone, for example, is preferably used for the heat insulating member 153 of the present embodiment. This makes it possible to improve the heat resistance of the heat insulating member 153. Further, one bottom surface of the heat insulation structural body 15 may be provided with a cap or the like that closes the opening 24M. The cap may be integrated with the heat insulation structural body 15 or may be formed separately.

3-2. Configuration of Heater

FIG. 12 is a schematic diagram illustrating an exemplary planar configuration of the heater 24. FIG. 13A is a cross-sectional schematic diagram illustrating the heater 24 along line III-III' illustrated in FIG. 12. FIG. 13B is a cross-sectional schematic diagram illustrating the heater 24 along line IV-IV' illustrated in FIG. 12. FIG. 13C is a cross-sectional schematic diagram illustrating the heater 24, more precisely, the wiring line 251 coupled to the heater 24, along line V-V' illustrated in FIG. 12.

The heater 24 is a sheet-shaped heating element including the heat generator 240X and the connector 240Y as described above. The heater 24 has a configuration in which an electrically-conductive film 242 is patterned on a flexible substrate 241. Specifically, the electrically-conductive film 242 includes, for example, a plurality of electrically-conductive films 242A, 242B, and 242C that are independent of each other, and expanded portions 242D1 and 242D2 in which the electrically-conductive films 242A, 242B, and 242C are integrated at their respective one ends and other ends. The plurality of electrically-conductive films 242A, 242B, and 242C that are independent of each other are patterned to be parallel to each other, for example. The plurality of electrically-conductive film 242A, 242B, and 242C portions that are independent of each other configure the heat generator 240X, and the expanded portions 242D1 and 242D2 configure the connector 240Y. To the connector 240Y, a pair of wiring lines 251 (251A and 251B) are joined via the solder 260.

The flexible substrate 241 is a support substrate having flexibility, and includes an insulating material such as polyimide (PI) resin, for example.

The electrically-conductive film 242 is preferably formed using an electrically-conductive material having relatively high electric resistance, for example. Examples of such an electrically-conductive material include a metallic material such as SUS (Steel Use Stainless), carbon, and the like. In the heat generator 240X, the electrically-conductive film 242 becomes hot by energization, because it is patterned as the plurality of electrically-conductive films 242A, 242B, and 242C independent of each other. On the other hand, in the connector 240Y, the electrically-conductive film 242 configures the expanded portions 242D1 and 242D2 wider than the electrically-conductive films 242A, 242B, and 242C by integrating the electrically-conductive films 242A, 242B, and 242C. Therefore, the electric resistance is smaller as compared with the electrically-conductive film 242A, 242B, and 242C portions. That is, the temperature of the connector 240Y when energized is maintained at a lower temperature than the heat generator 240X.

Note that the electrically-conductive film 242 of the present embodiment is partly patterned to have slits to thereby include the plurality of independent electrically-conductive films 242A, 242B, and 242C. The individual patterns are thus made narrow. However, it does not necessarily have to be a plurality of electrically-conductive films, and may be formed using one narrow electrically-conductive film. In other words, one electrically-conductive film may be used if the electrically-conductive film in the heat generator 240X continuous from the electrically-conductive film in the connector 240Y is narrow. Further, it is unnecessary for the electrically-conductive film of the heat generator 240X and the electrically-conductive film of the connector 240Y to have the same width at the connection portion. For example, narrow electrically-conductive films may extend in different directions from an end of the connector 240Y.

The pair of wiring lines 251 (251A and 251B) are copper (Cu) wiring lines, for example, having a flat-plate shape. One ends of the wiring lines 251A and 251B are electrically coupled respectively to the expanded portions 242D1 and 242D2, and the other ends are electrically coupled respectively to, for example, the pair of electrodes of the battery 13. As illustrated in FIG. 13C, the wiring lines 251A and 251B are, for example, covered with an insulating film 252 including epoxy resin, silicone resin, fluororesin, or the like, except for the connection portion with the expanded portions 242D1 and 242D2, for example. Note that FIGS. 12 and 13C illustrate an example in which the wiring lines 251A and 251B are collectively covered with the insulating film 252, but they may be covered separately.

In the connector 240Y, as illustrated in FIG. 13B, the expanded portion 242D1, the solder 260, and the wiring line 251A are stacked in this order, and the expanded portion 242D2, the solder 260, and the wiring line 251B are stacked in this order, on the flexible substrate 241. That is, the expanded portion 242D1 and the wiring line 251A are joined together via the solder 260, and the expanded portion 242D2 and the wiring line 251B are joined together via the solder 260. As the solder 260, solder such as SnCuNiGe (tin-copper-nickel-germanium) alloy may be used, for example. In addition, SnAgCu (tin-silver-copper)-based, AuSn (gold-tin)-based, Sn (tin)-based, or In (indium)-based solder may be used, for example.

3-3. Method of Manufacturing Heater

The heater 24 may be manufactured as follows, for example. First, as illustrated in FIG. 14A, the electrically-conductive film 242 is formed on the flexible substrate 141. Subsequently, as illustrated in FIG. 14B, a photoresist is applied onto the electrically-conductive film 242, for example. Then, pre-bake, exposure, development, and post-bake are obtained to form a resist film having a predetermined pattern. Then, the electrically-conductive film 242 having a predetermined pattern is formed by etching, for example. Next, as illustrated in FIG. 14C, the electrically-conductive film 242 except for a portion (e.g., the expanded portions 242D1 and 242D2) is covered by an insulating film 243 including epoxy resin, silicone resin, or fluororesin, for example.

In parallel with this, the wiring line 251 to be joined to the electrically-conductive film 242 is prepared. First, as illustrated in FIG. 15A, the wiring lines 251A and 251B covered with the insulating film 252 are prepared. Subsequently, as illustrated in FIG. 15B, a portion of the insulating film 252 is removed to expose the ends of the wiring lines 251A and 251B. Next, as illustrated in FIG. 16, the solder 260 in the form of a metallic foil or a paste is applied to the electrically-conductive film 242, for example, and heated at a temperature several tens of degrees higher than a melting temperature of the solder 260. Thus, the wiring lines 251A and 251B are joined to the electrically-conductive film 242. Thereafter, the heater 24 illustrated in FIG. 12 is completed by covering the surroundings of the junction by an insulating film.

Note that the joining of the expanded portions 242D1 and 242D2 and the wiring lines 251A and 251B in the connector 240Y illustrated in FIG. 12 is preferably performed at a position as far away as possible from the heat generator 240X. Specifically, it is preferable to join them at a position away from the edge of the heat generator 240X by about 2 mm to about 3 mm, for example. This makes it possible to prevent a decrease in joining strength between the expanded portions 242D1 and 242D2 and the wiring lines 251A and 251B due to heat transfer from the heat generator 240X.

3-4. Workings and Effects

In the heating device 20 of the present embodiment, the heater 24 having a sheet shape is used as a heat source. The heater 24 is disposed, for example, along the outer diameter of the shape retaining member 151 having a cylindrical shape. Around the heater 24 is provided the heat insulating member 153 directly or via the bonding layer 152. This enables the heat generated by the heater 24 to be efficiently stored inside the heat insulation structural body 15, specifically, inside the hole 24H of the heater 24 forming a cylindrical shape. Therefore, in addition to the effects of the first embodiment, power saving of the heating device 20 is enabled.

Further, in steps of manufacturing a typical heater, an electrically-conductive film to be a heating element is patterned, and then is copper-plated at a predetermined position to reduce an electric resistance value of the electrically-conductive portion. This plating step is a cause of an increase in manufacturing cost.

In contrast, in the heater 24 of the present embodiment, at the one ends and the other ends of the plurality of electrically-conductive films 242A, 242B, and 242C configuring the heat generator 240X, the expanded portions 242D1 and 242D2 in which the plurality of electrically-conductive films 242A, 242B, and 242C are integrated are provided. These are used as the connector 240Y with the pair of wiring lines 251A and 251B that apply a current to the plurality of electrically-conductive films 242A, 242B, and 242C. This enables the temperature of the connector 240Y when energized to be maintained at a temperature lower than the melting point of the solder, for example, which enables the solder joining of the electrically-conductive film 242 (the expanded portions 242D1 and 242D2) and the wiring line 251 (251A and 251B). Therefore, it is possible to reduce the manufacturing cost of the heater 24 and the heating device 20 including the heater 24.

Further, wiring lines having a flat-plate shape are used as the pair of wiring lines 251A and 251B. This results in an increase in joining area between the electrically-conductive film 242 (the expanded portions 242D1 and 242D2) and the wiring lines 251A and 251B in the connector 240Y, making it possible to improve the joining strength. Therefore, it is possible to improve reliability.

Although the present technology has been described above with reference to the first and second embodiments and the application example, the present technology is not limited to the above embodiments, and various modifications may be made. For example, the components, arrangement, and the like of the light-emitting device 10 and the heating device 20 exemplified in the above embodiments and the like are merely examples. It is unnecessary to include all the components, and other components may be further included.

Further, although the above embodiments and the like describe the case where the light-emitting device 10 and the heating device 20 include the heat insulation structural body 15, the heat insulation structural body 15 may be provided in another electronic apparatus.

Further, for example, the first embodiment describes an example in which the heat insulation structural body 15 includes the shape retaining member 151, the bonding layer 152, the heat insulating member 153, and the fixing member 154, in order from a position close to the light source section 14 (the hole 15H). However, the heat insulation structural body 15 may have another configuration. For example, as illustrated in FIG. 17, the heat insulating member 153 may be provided between the light source section 14 and the shape retaining member 151. That is, the shape retaining member 151 may be disposed on the outside of the heat insulating member 153. Further, the shape retaining member 151 may include a resin, for example. A resin has a smaller specific heat and specific gravity than a metal. That is, its heat capacity is smaller. Providing the shape retaining member 151 with a relatively low heat capacity at a position close to the heat source (the light source section 14) makes it easier to store heat inside the heat insulation structural body 15.

Further, although FIG. 5 illustrates an exemplary configuration of the shape retaining member 151, the shape retaining member 151 may have another configuration. FIGS. 18A, 18B, and 18C illustrate other examples (other examples (1), (2), and (3)) of the configuration of the shape retaining member 151 illustrated in FIG. 5. The shape retaining member 151 may thus be provided with a bored portion 151A. The bored portion 151A is a portion in which the metal, resin, or the like included in the shape retaining member 151 is partly bored. The bored portion 151A may have, for example, any shape such as a circle, an ellipse, or a square. Bored portions 151A with small size may be scattered throughout the shape retaining member 151 FIG. 18A), or one or two bored portions 151A may be provided to extend in a length direction of the cylinder FIGS. 18B and 18C). The bored portion 151A may be disposed in any way. The weight of the shape retaining member 151 is reduced by providing the shape retaining member 151 with the bored portion 151A. Therefore, the heat capacity of the shape retaining member 151 is reduced. Such a shape retaining member 151 enables heat to be easily stored inside the heat insulation structural body 15, and is suitably used for the heating device 20 used as, for example, an aroma diffuser or the like.

Further, although the above embodiments and the like describe an example in which the shape retaining member 151 has a cylindrical shape, the shape retaining member 151 may have another shape. For example, the shape retaining member 151 may have a tubular shape such as a prism shape.

Further, although the above embodiments and the like describe an example in which the heat insulating member 153 continuously surrounds the light source section 14, the heat insulating member 153 separated into a plurality of pieces may surround the light source section 14. Alternatively, the opening of the heat insulating member 153 may be provided on the side surface of the cylinder.

Further, although the first embodiment describes the case of performing the positioning of the heat insulation structural body 15 by using the locking member 17, the positioning with the heat insulation structural body 15 may be performed by another method. For example, the heat insulation structural body 15 may be fixed to the exterior member 11, a chassis, or the like.

It is to be noted that the effects described in this specification are merely illustrative and non-limiting, and other effects may be provided.

It is to be noted that the present technology may have the following configurations. According to the heat insulation structure and the electronic apparatus of the present technology having the following configurations, the heat insulating member 153 is provided to surround the light source section 14. This enables the vicinity of the light source section 14 to be heat-insulated more effectively, as compared with the case of providing the heat insulating member only in one direction of the heat source. This makes it possible to suppress the influence of the light source section 14 on its surroundings more effectively.

(1)

A heat insulation structure including:
a heat source;
a heat insulating member surrounding the heat source and having an opening; and a shape retaining member retaining a shape of the heat insulating member.

(2)

The heat insulation structure according to (1), in which the heat insulating member includes an aerogel.

(3)

The heat insulation structure according to (1) or (2), in which the opening includes a first opening and a second opening opposed to each other with the heat source therebetween.

(4)

The heat insulation structure according to any one of (1) to (3), in which the heat insulating member has a sheet shape.

(5)

The heat insulation structure according to any one of (1) to (4), in which an end face of the heat insulating member is exposed.

(6)

The heat insulation structure according to any one of (1) to (5), in which the shape retaining member has a tubular shape.

(7)

The heat insulation structure according to any one of (1) to (6), in which the shape retaining member includes a metal.

(8)

The heat insulation structure according to any one of (1) to (7), in which the shape retaining member has a light-reflecting property.

(9)

The heat insulation structure according to any one of (1) to (8), in which
the heat source has a sheet shape, and
the heat source and the heat insulating member are provided in this order around the shape retaining member.

(10)

The heat insulation structure according to any one of (1) to (9), further including a fixing member that fixes the heat insulating member to the shape retaining member.

(11)

The heat insulation structure according to (10), in which
the fixing member includes a shrinkable tube, and
the heat source and the heat insulating member are provided between the fixing member and the shape retaining member.

(12)

The heat insulation structure according to any one of (1) to (8), in which the heat insulating member surrounds the heat source via an air space.

(13)

The heat insulation structure according to (12), in which the shape retaining member is provided between the air space and the heat insulating member.

(14)

The heat insulation structure according to (12) or (13), further including a fixing member that fixes the heat insulating member to the shape retaining member, in which
the fixing member includes a shrinkable tube, and
the heat insulating member is provided between the fixing member and the air space.

(15)

The heat insulation structure according to any one of (1) to (14), further including a positioning section configured to determine a position of the heat insulating member with respect to the heat source.

(16)

The heat insulation structure according to any one of (1) to (15), in which the heat insulating member continuously surrounds the heat source.

(17)

An electronic apparatus including a heat insulation structure,
the heat insulation structure including
a heat source,
a heat insulating member surrounding the heat source and having an opening, and
a shape retaining member retaining a shape of the heat insulating member.

(18)

A heating element including:
a heat generator including an electrically-conductive film having a first width;
a connector including a pair of expanded portions in which one end and the other end of the electrically-conductive film are integrated with each other, the pair of expanded portions having a second width wider than the first width; and
a pair of wiring lines having a flat-plate shape and joined to the pair of connectors via solder.

(19)

The heating element according to (18), in which the heat generator includes a plurality of the electrically-conductive films having the first width and extending from the expanded portion.

(20)

The heating element according to (18) or (19), in which the electrically-conductive film included in the heat generator and the connector, and the pair of wiring lines include electrically-conductive materials different from each other.

(21)

The heating element according to any one of (18) to (20), in which, in the connector, respective ones of the pair of expanded portions, the solder, and the pair of wiring lines are stacked in this order.

(22)

The heating element according to at least one of (18) to (21), in which the heat generator and the connector are provided on a flexible substrate.

(23)

The heating element according to any one of (18) to (22), in which the pair of wiring lines are covered with an insulating film, except for ends that are joined to the pair of expanded portions.

This application claims the benefit of Japanese Priority Patent Application No. 2019-114488 filed with the Japan Patent Office on Jun. 20, 2019, and Japanese Priority Patent Application No. 2019-200073 filed with the Japan Patent Office on Nov. 1, 2019, the entire contents of each which are incorporated herein by reference.

It should be understood by those skilled in the art that various modifications, combinations, sub-combinations and alterations may occur depending on design requirements and other factors insofar as they are within the scope of the appended claims or the equivalents thereof.

The invention claimed is:

1. A heat insulation structure, comprising:
a heat source;
a heat insulating member that is configured to surround the heat source and includes an opening; and
a shape retaining member that is on an inner peripheral side of the heat insulating member, wherein the heat insulating member is configured to wrap around the shape retaining member to follow an outer shape of the shape retaining member.

2. The heat insulation structure according to claim 1, wherein the heat insulating member includes an aerogel.

3. The heat insulation structure according to claim 1, wherein the opening comprises a first opening and a second opening that is opposite to the first opening with the heat source between the first opening and the second opening.

4. The heat insulation structure according to claim 1, wherein the heat insulating member has a sheet shape.

5. The heat insulation structure according to claim 1, wherein an end face of the heat insulating member is in contact with air or a coating of resin.

6. The heat insulation structure according to claim 1, wherein the shape retaining member has a tubular shape.

7. The heat insulation structure according to claim 1, wherein the shape retaining member includes a metal.

8. The heat insulation structure according to claim 1, wherein the shape retaining member has a light-reflecting property.

9. The heat insulation structure according to claim 1, wherein the heat source has a sheet shape, and
the heat insulating member is at a position that is closer to the heat source than the shape retaining member.

10. The heat insulation structure according to claim 1, further comprising a fixing member that is configured to fix the heat insulating member to the shape retaining member.

11. The heat insulation structure according to claim 10, wherein the fixing member comprises a shrinkable tube, and
the heat source and the heat insulating member are between the fixing member and the shape retaining member.

12. The heat insulation structure according to claim 1, wherein the heat insulating member is configured to surround the heat source via an air space that is between the heat source and a heat insulation structural body of the heat insulation structure.

13. The heat insulation structure according to claim 12, wherein the shape retaining member is provided between the air space and the heat insulating member.

14. The heat insulation structure according to claim 12, further comprising a fixing member that is configured to fix the heat insulating member to the shape retaining member, wherein the fixing member comprises a shrinkable tube, and the heat insulating member is between the fixing member and the air space.

15. The heat insulation structure according to claim 1, further comprising a positioning section configured to determine a position of the heat insulating member with respect to the heat source.

16. The heat insulation structure according to claim 1, wherein the heat insulating member is configured to continuously surround the heat source along a side surface of the shape retaining member that has a cylindrical shape.

17. The heat insulation structure according to claim 1, wherein the heat source is in a direct contact with the heat insulating member.

18. An electronic apparatus comprising a heat insulation structure, wherein the heat insulation structure includes:
a heat source;
a heat insulating member that is configured to surround the heat source and includes-having an opening; and
a shape retaining member that is on an inner peripheral side of the heat insulating member, wherein the heat insulating member is configured to wrap around the shape retaining member to follow an outer shape of the shape retaining member.

* * * * *